United States Patent [19]

Williamson

[11] Patent Number: 5,669,758

[45] Date of Patent: Sep. 23, 1997

[54] WIND TURBINE

[76] Inventor: Larry D. Williamson, Rte. #1, Box 156A, Ranger, Tex. 76470

[21] Appl. No.: 592,884

[22] Filed: Jan. 24, 1996

[51] Int. Cl.⁶ .................................................... F03B 5/00
[52] U.S. Cl. ........................... 416/4; 416/11; 416/189
[58] Field of Search .................. 416/4, 11, 132.8, 416/189; 415/4.3, 4.5, 218.1, 219.1

[56] References Cited

U.S. PATENT DOCUMENTS

| 104,918 | 6/1870 | St. Clair . | |
|---|---|---|---|
| 231,253 | 8/1880 | Austin . | |
| 984,599 | 2/1911 | Pichault . | |
| 1,433,995 | 10/1922 | Fowle . | |
| 2,137,559 | 11/1938 | Algee | 416/189 |
| 2,517,135 | 8/1950 | Rudisill . | |
| 4,147,472 | 4/1979 | Kling | 416/189 |
| 4,276,033 | 6/1981 | Krovina . | |
| 4,722,665 | 2/1988 | Tyson . | |
| 4,832,571 | 5/1989 | Carrol | 416/11 |

FOREIGN PATENT DOCUMENTS

| 455 854 | 11/1928 | Germany . | |
|---|---|---|---|
| 25 03 624 A1 | 7/1975 | Germany . | |
| 40 34 383 A1 | 4/1992 | Germany . | |
| 57-370 | 1/1982 | Japan . | |
| 213022 | 3/1924 | United Kingdom | 416/189 |

*Primary Examiner*—John T. Kwon

[57] ABSTRACT

A wind turbine having a central deflecting cone and a shroud surrounding the cone. The shroud in cooperation with the cone direct air flow to turbine blades which extend across the narrowest gap between said shroud and said cone. The wind turbine is rotatably supported at the apex of the cone such that wind passing through the blades causes the turbine to spin. A transfer gear box near the apex of the cone causes rotation of a power transmission shaft which also acts as the support tower for the turbine. The shroud is made of a fabric material and assumes its proper shape under the influence of the wind passing through the turbine.

16 Claims, 9 Drawing Sheets

WIND TURBINE

BACKGROUND OF THE INVENTION

1. Field of the Invention

The present invention relates to a wind driven turbine for generating power from the wind.

2. Description of the Prior Art

The dwindling domestic supply of fossil fuels and the political ramifications of dependence on imported supplies, along with a growing awareness of the negative environmental impacts caused by our excessive consumption has resulted in the development of various power generating systems utilizing wind energy. In addition, wind power has long been relied upon to provide a source of energy in remote areas. However, none of the prior art systems provide the combination of strength, flexibility, economy, and ease of manufacture afforded by the wind turbine of the present invention.

U.S. Pat. No. 104,918, issued to St. Clair on Jun. 28, 1870, shows a wind wheel with a shrouded fan. St. Clair lacks a central conical fairing.

U.S. Pat. No. 231,253, issued to Austin on Aug. 17, 1880, shows a wind wheel with a shrouded fan and a central bullet fairing. Austin does not use the same construction as that used in the present invention. In addition, Austin's wind wheel is upstream of the bevel gear housing and Austin does not show any means for directing the wind wheel into the wind.

U.S. Pat. No. 984,599, issued to Pichault on Feb. 21, 1911, shows a wind wheel with a ducted fan and a central bullet fairing. Pichault does not use the same construction as that used in the present invention. In addition, Pichault does not show any means for directing the wind wheel into the wind. In addition, Pichault's outer shroud does not rotate with or support the turbine blades.

U.S. Pat. No. 1,433,995, issued to Fowle on Oct. 31, 1922, shows a radial flow wind turbine. Fowle does not show an axial flow, shrouded turbine.

U.S. Pat. No. 2,517,135, issued to Rudisill on Aug. 1, 1950, shows a wind turbine wherein a funnel shaped baffle directs the wind towards the turbine blades. The blades of the Rudisill turbine are external to the funnel shaped baffle. In addition, Rudisill's turbine is upstream of the bevel gear housing.

U.S. Pat. No. 4,276,033, issued to Krovina on Jun. 30, 1981, shows a ship's sail in the form of a fan, the fan blades being made of triangular pieces of fabric. Krovina does not show a shrouded wind turbine.

U.S. Pat. No. 4,722,665, issued to Tyson on Feb. 2, 1988, shows a water turbine in the form of a cone having spiral blades extending from its surface. Tyson does not show a shrouded wind turbine.

Japanese patent document number 57-370, dated Jan. 5, 1982, shows a wind turbine provided at the free end of a wind sock. Japanese document '370 does not use the same construction as that used in the present invention. In addition, the wind turbine of Japanese document '370 is limited strictly to driving an electrical generator.

German patent document number 455 854, dated Nov. 10, 1928, shows a wind turbine with a shrouded fan and a central bullet fairing. German document '854 does not use the same construction as that used in the present invention. In addition, the wind turbine of German document '854 is upstream of the attachment point of the turbine support tower.

German patent document number 25 03 624, dated Jul. 31, 1975, shows a wind turbine in the form of a ducted fan. German document '624 does not use the same construction as that used in the present invention. In addition, German document '624 does not show a duct that rotates with the fan blades.

German patent document number 40 34 383 A1, dated Apr. 30, 1992, shows a wind turbine in the form of a ducted fan. German document '383 does not use the same construction as that used in the present invention. In addition, German document '383 does not show a duct having an inlet down stream of the support attachment of the turbine.

None of the above inventions and patents, taken either singly or in combination, is seen to describe the instant invention as claimed.

SUMMARY OF THE INVENTION

The present invention is directed to a wind turbine having a central deflecting cone and a shroud surrounding said cone. The shroud in cooperation with the cone direct air flow to turbine blades which extend across the narrowest gap between said shroud and said cone. The wind turbine is rotatably supported at the apex of the cone such that wind passing through the blades causes the turbine to spin. A transfer gear box near the apex of the cone causes rotation of a power transmission shaft which also acts as the support tower for the turbine. The shroud is made of a fabric material and assumes its proper shape under the influence of the wind passing through the turbine.

Accordingly, it is a principal object of the invention to provide a wind turbine made primarily of light weight, ultra high strength, flexible materials that by design use tension to absorb extremely violent wing energy.

It is another object of the invention to provide a wind turbine which naturally faces into the wind at all times.

It is a further object of the invention to provide a wind turbine that derives energy from the wind regardless of wind speed without breaking apart in very high winds.

Still another object of the invention is to provide turbine blades which operate efficiently over a wide range of wind speeds without requiring complicated adjustment mechanisms.

It is an object of the invention to provide a simplified tower construction method which is capable of supporting the wind turbine in extreme winds, transmit high torque loads, and be easily height adjustable.

It is an object of the invention to provide a wind turbine system which can be prefabricated, shipped in pieces, and readily assembled at remote locations.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Referring to FIGS. 1, 2, 4, and 5, the present invention is a wind turbine system including a wind turbine 10, support shaft 12, and gearbox 14.

Figure 1:
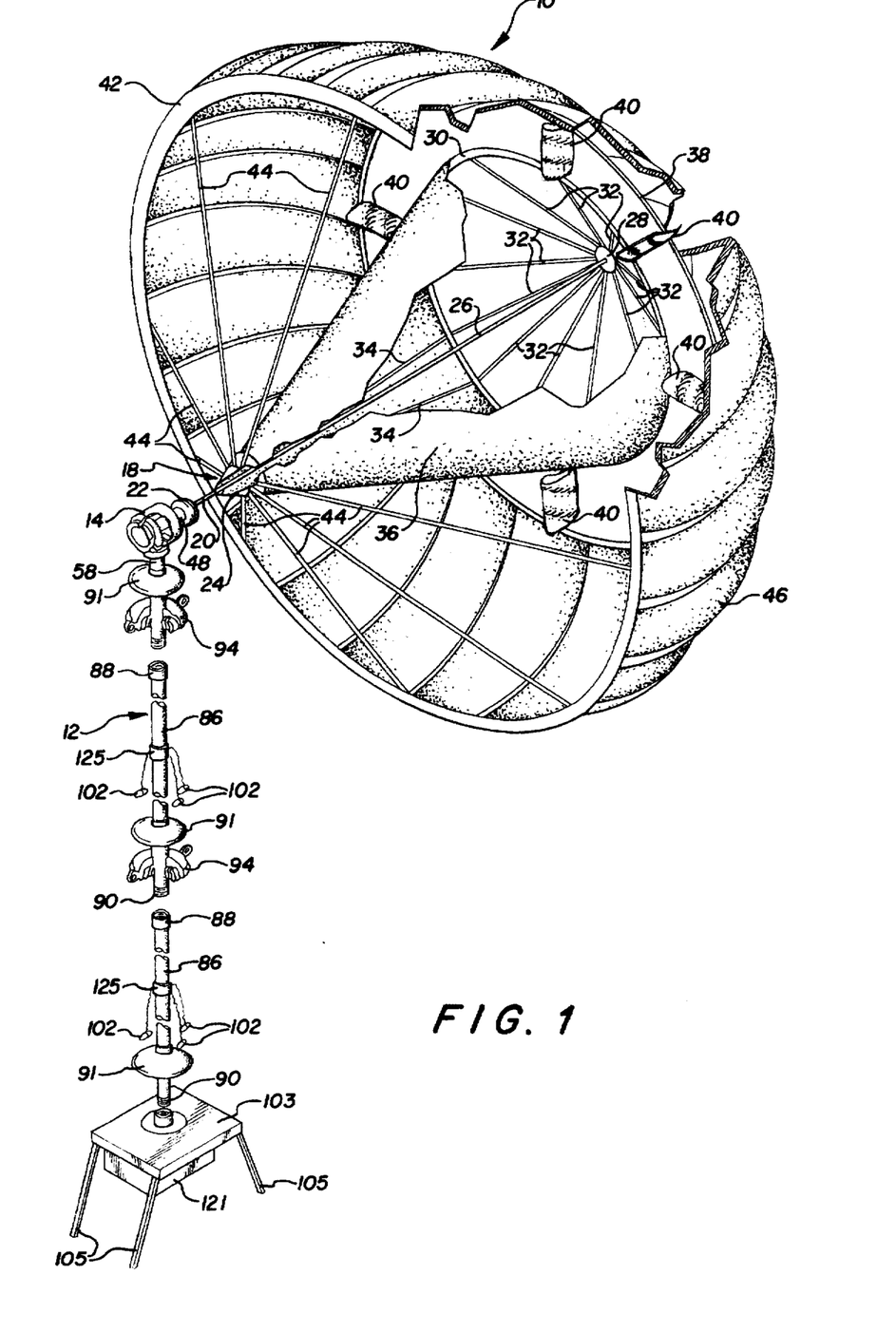
FIG. 1 is a perspective view of the wind turbine with its associated power transmission elements, partially broken away to reveal internal detail.
Figure 2:
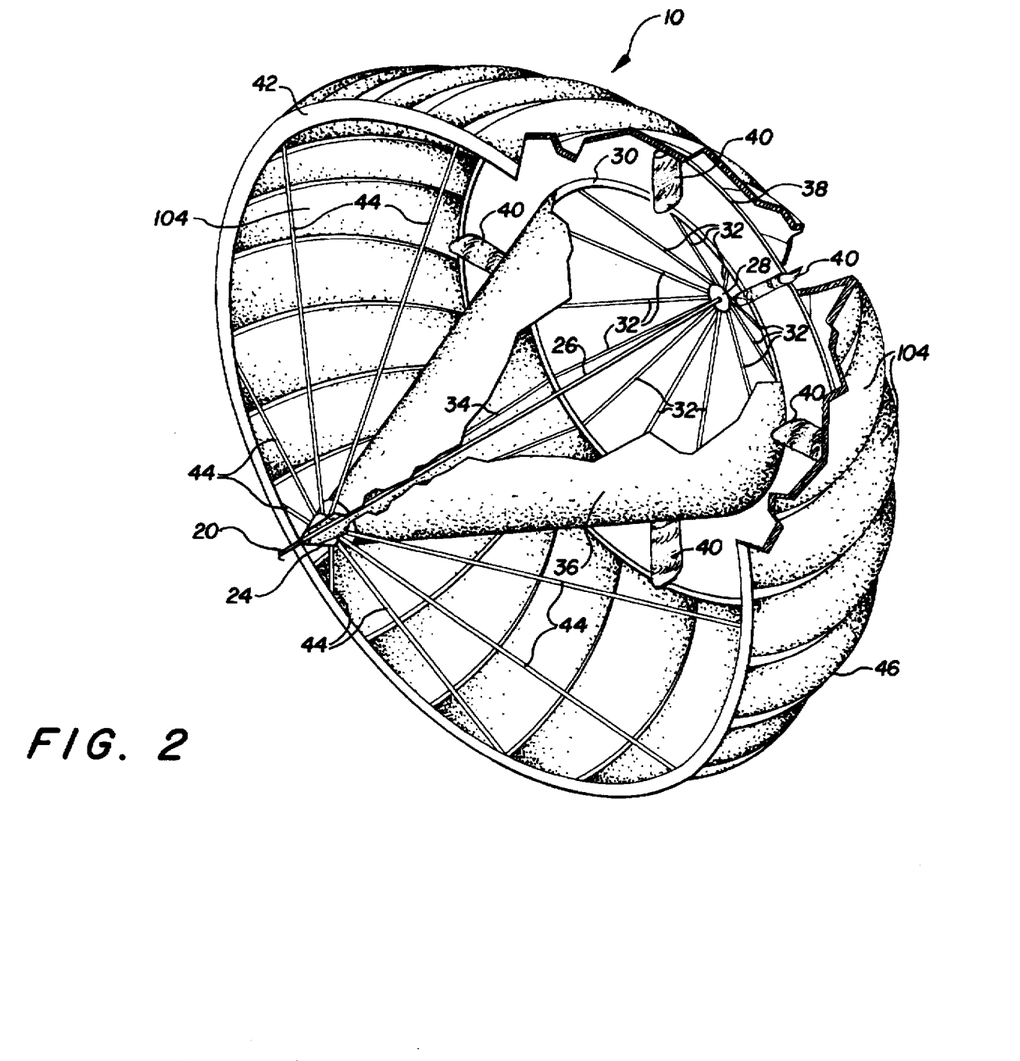
FIG. 2 is a perspective close-up view of the turbine partially broken away to reveal internal detail.

The turbine 10 includes a metallic apical support structure 18 having a cylindrical shaft 20, a first flange 22, and a hollow substantially frustoconical portion 24 having a wide mouth and a narrow end attached to the cylindrical shaft 20. A support rod 26 having a first end and a second end, is attached at its first end to the narrow end of the frustoconical portion 24. The support rod 26 passes through the concavity defined by the frustoconical portion 24, and extends for some distance finally terminating in a second flange 28. The rod 26 is preferably made of a light weight, highly strong composite material such as the carbon fiber composites used in the aircraft industry. Second flange 28 has an air valve stem for pressurizing support rod 26 to increase rigidity.

A first support ring 30 surrounds the support rod 26 near the flange 28. Support ring 30 is preferably made of polyethylene pipe, very similar to the polyethylene pipe used for natural gas pipelines, bent into a ring and heat fused at its ends by well known techniques to form a structure resembling a HOOLA-HOOP™. A first set of support cables 32 extend between the flange 28 and support ring 30. A second set of support cables 34 which also serve as torque transmitting cables, extend between the frustoconical portion 24 and the support ring 30. The support cables 32 and 34 are under tension and maintain the support ring 30 in a fixed position relative to the support rod 26.

A fabric cover 36 covers the support cables 34 and forms a central substantially conical fairing, the function of which will be described later. Although only two cables 34 are shown in the interest of reducing clutter in the drawings, it should be noted that a plurality of cables 34, preferably equal in number to cables 32, are symmetrically distributed about rod 26 and give fabric cover 36 its conical shape. A second support ring 38 is positioned concentrically with ring 30, and has a diameter larger than that of ring 30. Ring 38 is similar in structure and is made in the same manner as ring 30. Ring 38 is kept in position by the plurality of turbine blades 40 extending between the ring 30 and the ring 38. Each turbine blade 40 is rigidly fixed to rings 30 and 38 at its respective ends.

A third support ring 42 is positioned concentrically with rings 30 and 38. Ring 42 has a larger diameter than either of rings 30 and 38, and is positioned closer to the frustoconical portion 24 relative to rings 30 and 38. A third set of support cables 44, extending between ring 42 and the frustoconical portion 24, tether ring 42 to the support structure 18. A fabric ring 46 extends between rings 42 and 38. This fabric ring 46 tends to open in the manner of a parachute when wind of sufficient speed hits the turbine 10. Under such conditions, the fabric ring 46 assumes essentially the shape of a truncated parabola forming a shroud that tapers in diameter, for the turbine blades 40. Also under these conditions, the shroud 46 pulls on ring 42 which puts cables 44 under tension. The predetermined wind speed which can generate enough torque to rotate turbine 10 is also sufficient to inflate the shroud 46, and is dictated by the dimensions chosen for any particular turbine made in accordance with the design of the present invention. Wind having any speed greater than this predetermined minimum speed will inflate the shroud 46 and rotate turbine 10. With the shroud 46 inflated, the cables 44 in cooperation with the shroud 46 maintain the ring 42 in the desired position relative to the support rod 26.

Figure 5:
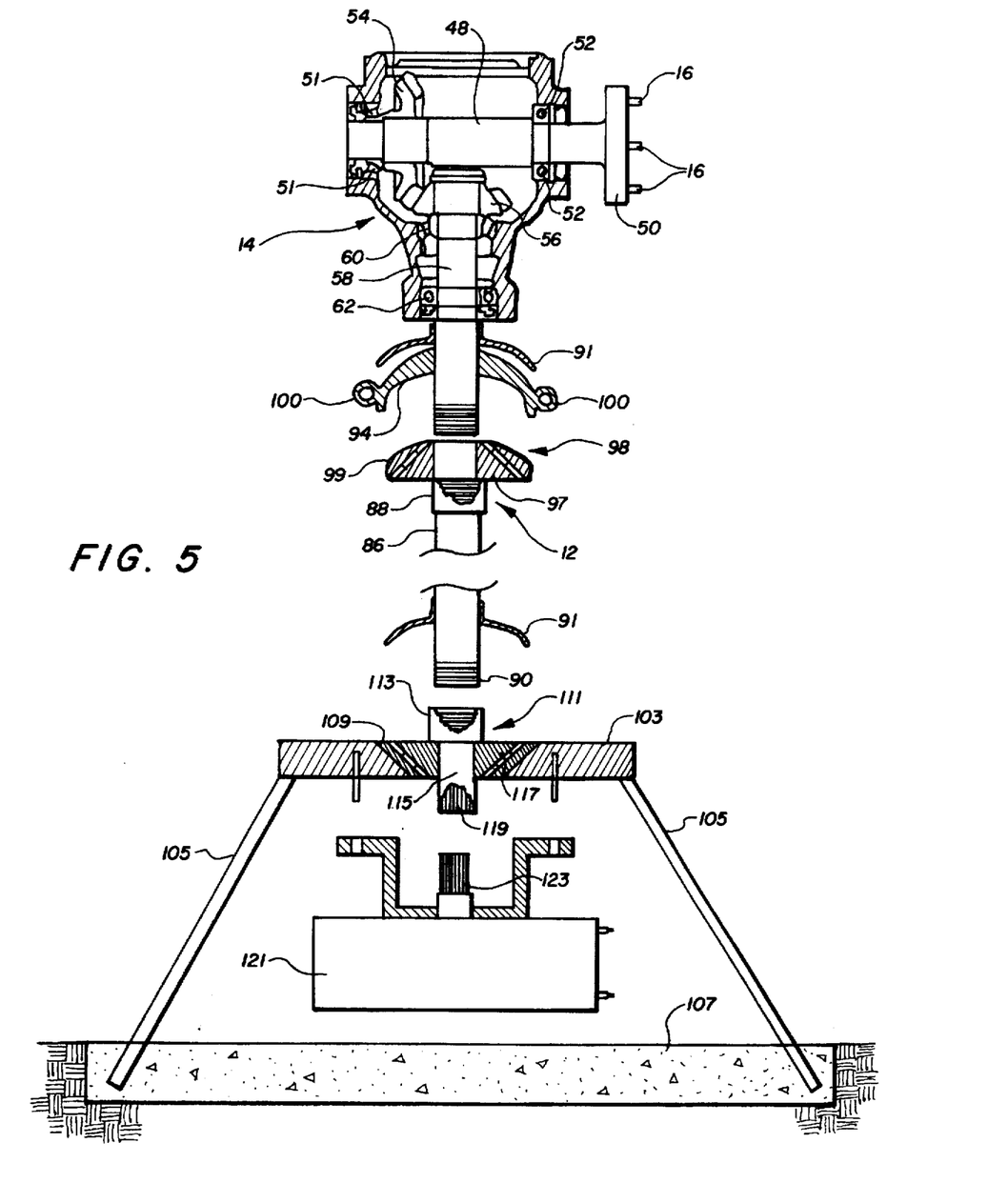
FIG. 5 is a detailed elevational view of the support tower showing details of the top gearbox, the sealed bearings, and the tower support bearing.

A horizontally positioned stub shaft 48 has a flange 50 fixed to its end which protrudes from gearbox 14. Flange 50 has through studs 16 which register with through holes in flange 22, and allow flange 22 to be fixed to flange 50 by means of nuts. Because of the rigid connection between support structure 18 and stub shaft 48, rotation of turbine 10 in response to a wind will cause rotation of stub shaft 48. Preferably, stub shaft 48 is rotatably and thrust load supported within gearbox 14 by tapered roller bearings 51 and ball bearings 52. Through the action of various ratio bevel gears 54 and 56, rotation of stub shaft 48 causes proportional rotation of another stub shaft 58. Stub shaft 58 is rotatably and thrust load supported by tapered roller and ball bearings 60 and 62 within gearbox 14.

Stub shaft 58 is vertically mounted with its threaded end facing down by first sliding a bell shaped rain shield 91 on up over its threads and placed in close proximity to the gearbox housing 14. Secondly, a tower bearing unit 94 is slid up over stub shaft 58, and thirdly, a sealed tapered roller bearing 98 is installed up over stub shaft 58. The bearing 98 inner race 97 fits snugly upon shaft 58 and rests upon a female coarse threaded collar 88 of section shaft 86 (see FIG. 5). Thus when stub shaft 58 is threadedly mounted on top of shaft section 86 tower bearing unit 94 rests upon outer race 99 of sealed tapered roller bearing 98 in a ball and socket manner, preventing binding with stub shaft 58 and allowing stub shaft 58 to rotate freely and transmit rotational energy of turbine 10 to shaft section 86. Each tower bearing unit 94 has attachment points 100 to allow attachment of guy wires 101 which extend to the ground and rigidly support the gearbox 14 and shaft sections 86 in a vertical position while tower bearing unit 94 remains in a relatively fixed position.

Returning to FIGS. 1–5, a tower 12 is made up of a plurality of sections 86 threadedly joined to one another in an end-to-end arrangement. Each section 86 has a female coarse threaded collar 88 at one end, and a male coarse thread 90 at the other. The threads are oriented such that as tower 12 spins the connections between sections 86 are tightened. At each connection point another tower bearing unit 94 and its respective sealed bearing 98 are installed as previously described for connection between stub shaft 58 of gearbox 14 and the upper most shaft section 86.

Tower 12 terminates on top of a base platform 103 (see FIGS. 4 and 5) consisting of a raised steel platform supported by four steel beams 105. Each beam is arc welded to the underside of the steel platform and extends into a concrete pad 107 poured into the ground. Located on the top side and in a central position of the base platform 103 is a large bearing housing 109, into which a sealed oversized tapered roller bearing 111 is mounted such that the female threaded collar 113 of splined drive shaft 115 rests upon its inner bearing race 117. Thus when bottom most section 86 is threadedly fixed to splined drive shaft 115, bearing 111 supports the complete weight of turbine 10, plus gearbox 14, plus tower 12 while maintaining rotational freedom of the entire system. Additionally, female splined end 119 of the splined drive shaft 115 now extends below the base platform and can be directly connected to any machinery 121 having a male splined drive shaft 123 by simply bolting the machinery to the bottom of the base platform 103. Machinery 121 could for example be a generator, a water pump, a pneumatic pump, a hydraulic pump, or a secondary gearbox. This method of attaching equipment to the turbine will lower operating and maintenance costs by making repair or replacement of machinery quick and easy.

DISCUSSION OF ADVANTAGES

Returning to turbine 10, conical fairing 36 in cooperation with shroud 46 increases the initial free stream velocity of the wind by concentrating its inertial force into a narrowing band of substantially higher velocity wind thereby allowing turbine blades 40 to capture energy from a given wind stream much more efficiently, especially with initial low wind speeds. A simplified explanation of the wind speed magnification can be obtained by using the fluid physics formula which states that $A_1 \cdot V_1 = A_2 \cdot V_2$ where $A_1$ is the area of the initial wind stream captured by shroud 46, $V_1$ is the initial wind stream velocity, $A_2$ is the annular area at which the turbine blades 40 are located, and $V_2$ is the resulting wind stream velocity at the annular area. It can be seen that substantial increases in wind velocity can be expected due to the use of shroud 46 and since as wind speed doubles power output from turbine blades 40 theoretically increases eight fold, useful power can be obtained from relatively slow winds. Thus turbine blades 40 are in a position to capture substantially more energy from any given wind speed but especially low initial wind speeds.

As wind speeds increase, rotational speed of turbine 10 will also increase, causing proportional increases in centrifugal and gyroscopic forces exerted upon turbine 10. Thus all forces exerted upon turbine 10 increase proportionally thereby balancing one another. Therefore, turbine 10 retains its original basic shape due to rotation, throughout a very wide range of wind speeds. However, it will react to absorb turbulent, violent winds by flexing out of this basic shape temporarily until rotational forces re-establish its original rotational shape. Thus the torque transfer "loop" composed of apical support structure 18, cables 44, support ring 42, shroud 46, support ring 38, turbine blades support ring 30, and cables 34 back to apical support structure 18 are also placed, in unison, under similar proportional tension loads relative to wind velocity. This results in a very efficient torque transfer mechanism from the turbine blades 40 back to the apical support structure 18 for any given wind speed.

Additionally, there is enough parachute drag effect combined with gyroscopic forces, leveraged over the distance from the gearbox 14 back to turbine blades 40 to maintain the turbine 10 down wind of the tower and thus no yaw alignment mechanism is required.

Please note, that support rod 26 is not mentioned as a torque transferring mechanism. Its only purpose is to support the turbine 10 during no wind conditions.

Another advantage of the turbine 10 is the substantially distal radius occupied by turbine blades 40, since torque is a product of force applied to a radius. Energy captured by turbine blades 40 results in a very high torque load transferred to gearbox 14.

Notice turbine 10's rather triangular side profile, and placement of tower bearing unit 94 located immediately under gearbox 14 on stub shaft 58, on essentially the apex of that triangle. This allows the guy wire system to extend from tower 12 at a much flatter angle, reducing thrust loads upon the tower bearing 98. Thus tower 12 can fully support very high wind shear and torque loads.

Figure 4:
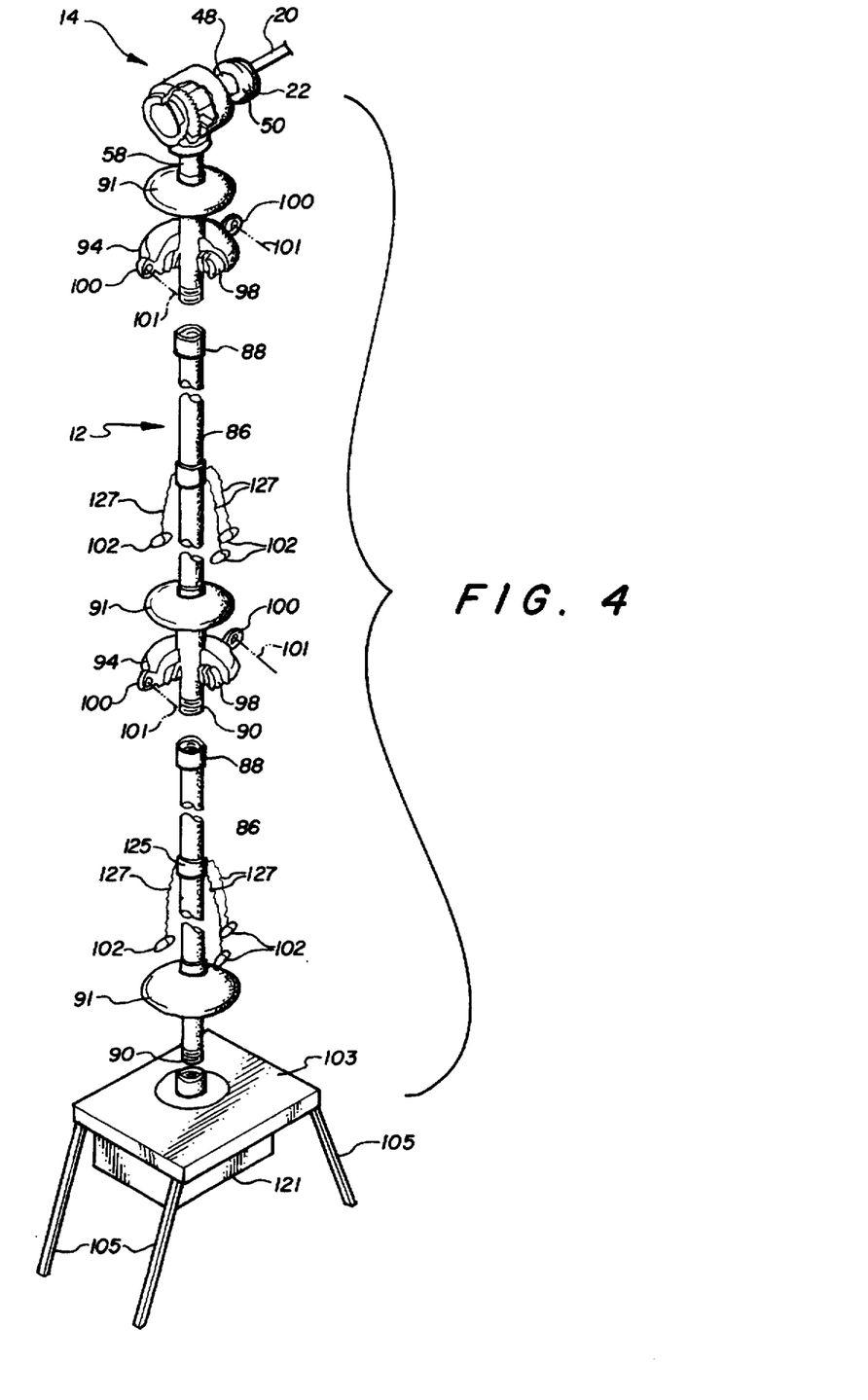
FIG. 4 is a detailed perspective view of the support tower showing the shaft sections and the arrangement of the tower bearing units.

Returning to tower 12, the preferred embodiment is relatively simple. Each section 86 is basically a joint of steel pipe having coarse threads similar to those used on drill stem tubing. The female collared end 88 acts as the support for tower bearing 98, which is a sealed unit. Thus, to extend tower 12 an additional joint of pipe with its respective tower bearing unit 98 is screwed into the existing tower 12 and the respective guy wire systems repositioned. The steel pipe sections 86 would, of coarse be engineered to fully support the torque loads and weights of a given system. Optionally, tuning weights 102 can be added by simply slipping a smooth collar 125 up onto section 86, and welding it into place at the desired location. Preferably three tuning weights would be suspended by cables 127 from the collar 125. The tower section 86 can then be balanced by either adding or subtracting weight from each tuning weight 102, so that section 86 has a dampening force to counteract bowing and vibrations caused by harmonic oscillations.

CONSTRUCTION OF CRITICAL COMPONENTS

Turbine blades 40 are preferably made from the same plastic material as the support rings 30, 38, and 42, namely polyethylene. This will allow turbine blades 40 to be manufactured either by extrusion techniques into a hollow airfoil shaped cross section, or by vacuum molding techniques, or by combining both techniques. Additionally, end sections 106 and branch saddles 108 can be made using injection molding techniques (see FIG. 6). Since polyethylene is a heat fusible material, this allows all the various plastic parts to be made at a factory and then be shipped to a remote location and assembled on site using various heat fusion welding techniques well known to the polyethylene gas pipeline industry. This cuts shipping costs significantly and also makes it possible to repair a damaged turbine blade simply by cutting away the damaged blade and fusing in a new one. Additionally, heat fusion welded joints have higher strength factors than their respective components resulting in a unified structure of high strength.

Other suitable techniques for manufacturing or repairing the turbine blades includes injection molding, press forming, adhesive bonding, and combinations thereof.

Figure 6:
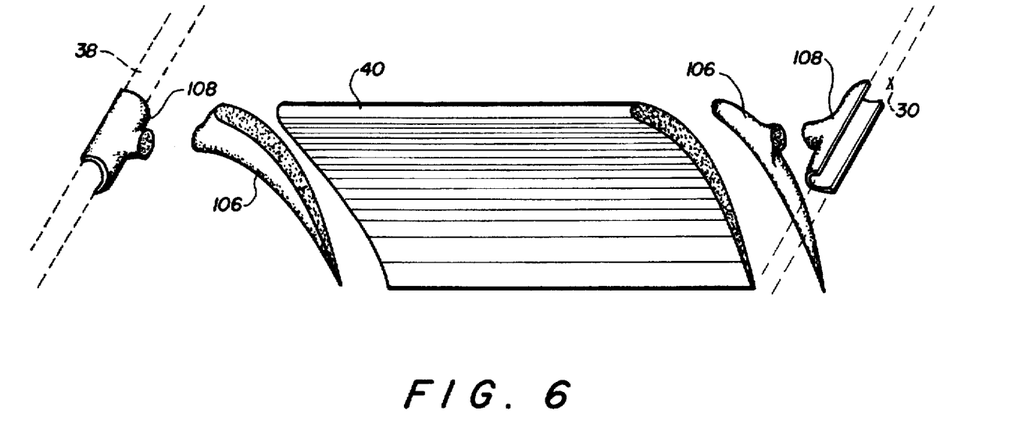
FIG. 6 is a fragmentary view showing details of the construction of the airfoil type turbine blade.

A typical assembly would begin with the support rings 42, 38, 30 being made by butt welding the ends of a polyethylene pipe, having the appropriate length, diameter, and thickness, together. Second, the airfoil sections 40 would be butt fused to the end sections 106. Third, the branch saddles 108 would be saddle welded to the appropriate locations on support rings 30 and 38. Forth, turbine blade end sections 106 are welded by butt fusion techniques to their respective saddle branches 108 such that they are rigidly fixed at the correct pitch angle relative to support rings 30 and 38. Lastly, each individual support ring and turbine blade would be tapped and an air valve stem (not shown), similar to valve stems used in tires, would be installed. This way, each component can be pressurized resulting in a rather rigid unified structure. The rest of the turbine 10 can be easily assembled by one skilled in the art, so the steps for further assembly will not be discussed here.

Figure 7:
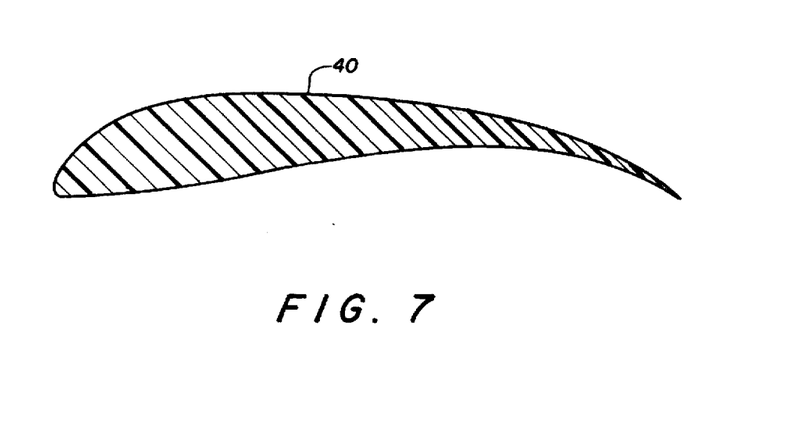
FIG. 7 is a representative airfoil section usable for the basic airfoil type turbine blade.
Figure 9A:
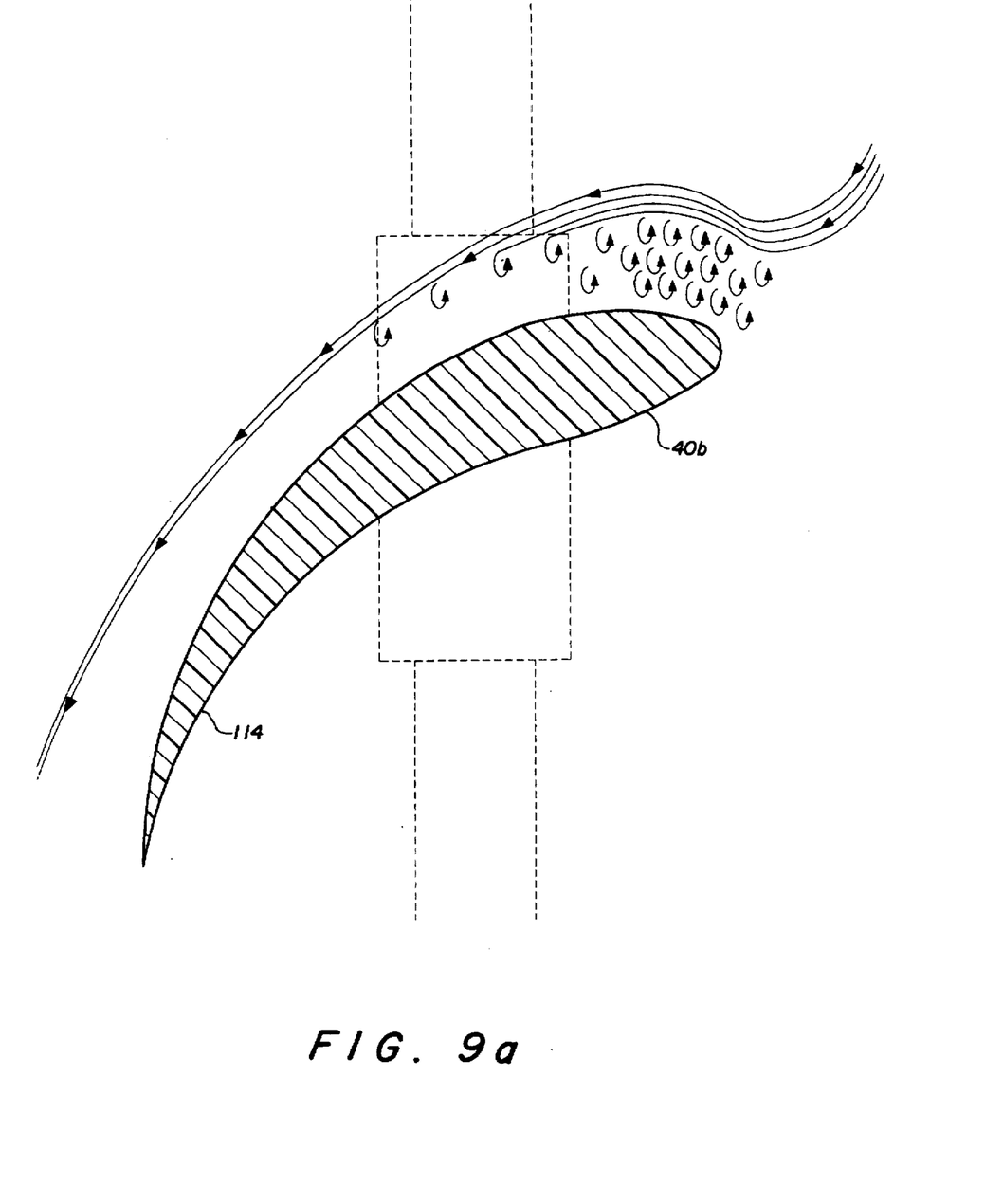
FIG. 9a is a fragmentary view showing a deformable airfoil turbine blade at low wind speed.
Figure 9B:
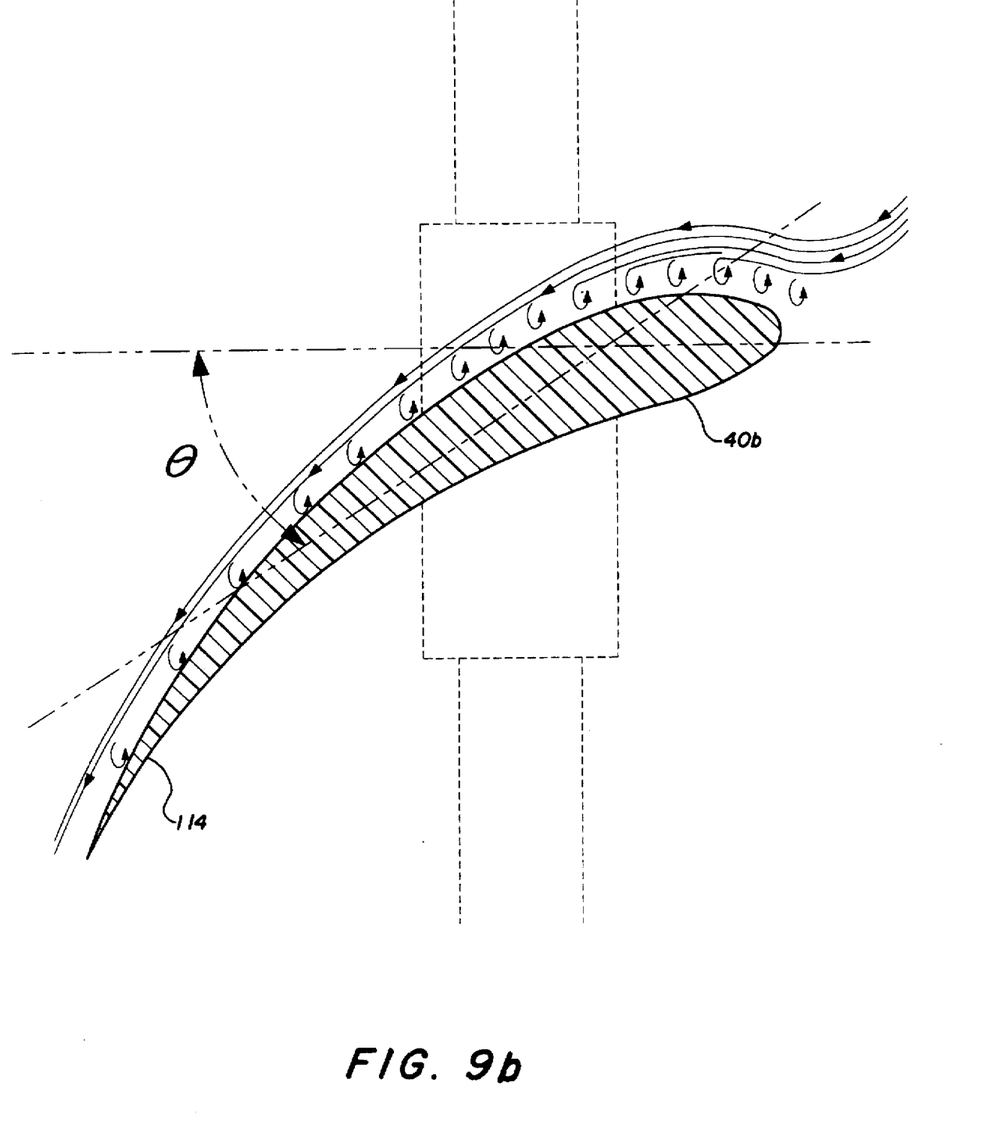
FIG. 9b is a fragmentary view showing a deformable airfoil turbine blade at high wind speed, and illustrating the pitch angle of an airfoil.
Figures 10, 11, 12A, 12B:
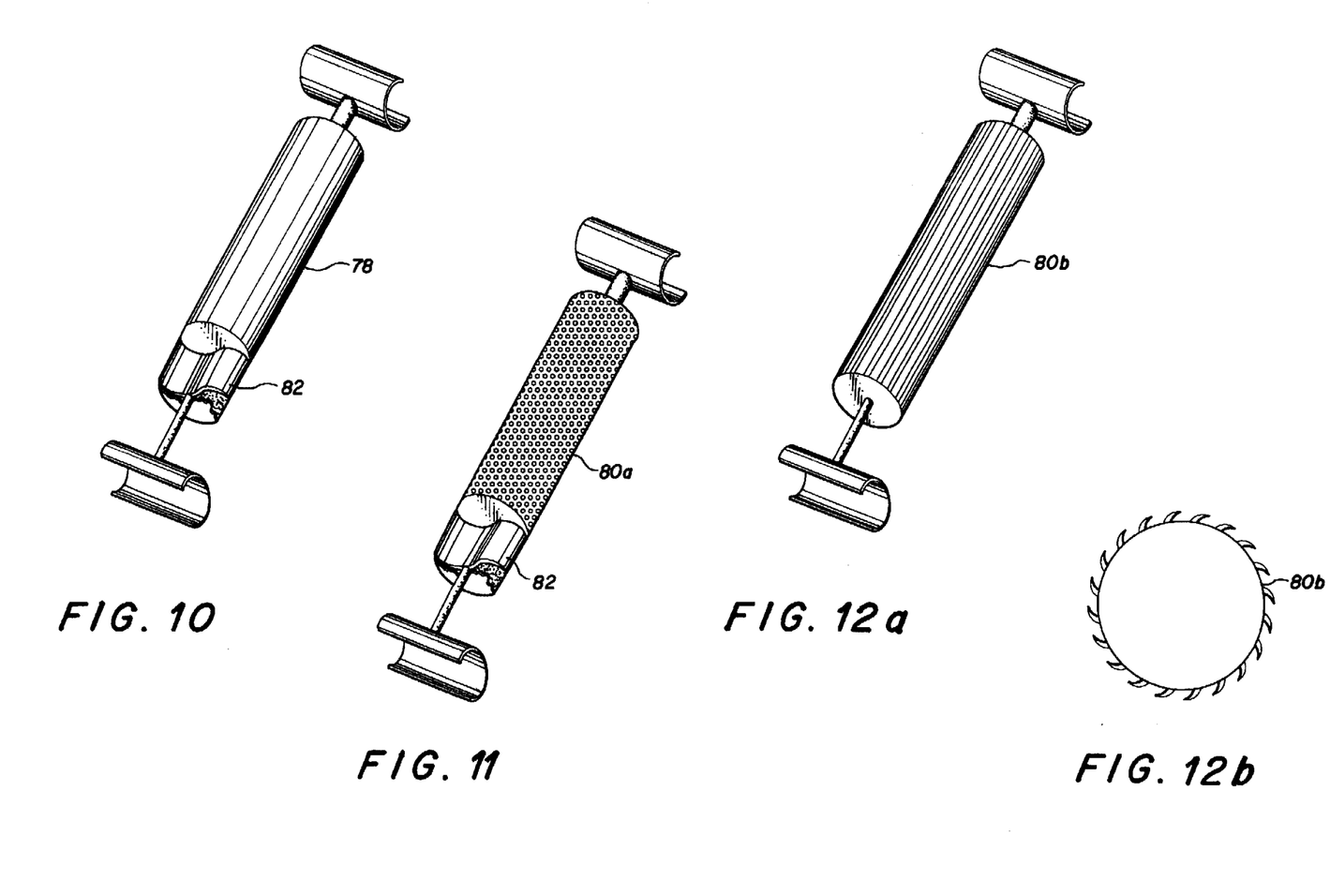
FIG. 10 is a fragmentary perspective view of an alternative turbine blade design including a rotating cylinder and an S-turbine, usable in the wind turbine of the present invention.
FIG. 11 is a fragmentary perspective view of an alternative turbine blade design including a rotating cylinder having a dimpled surface, usable in the wind turbine of the present invention.
FIG. 12a is a fragmentary perspective view of an alternative turbine blade design including a rotating cylinder having a ribbed surface, usable in the wind turbine of the present invention.
FIG. 12b is an end view of the alternative turbine blade design including a rotating cylinder having a ribbed surface, showing the geometry of the ribs.

Referring to FIGS. 7 and 9b, when the wind hits blades 40, which make an angle θ relative to the free stream velocity of the wind, lift is generated which has a force component parallel to the plane of ring 30. This lift force thus causes the turbine 10 to spin as the wind flows through it.

As the angle θ is decreased the lift from blade 40 is decreased while the drag on blade 40 is also decreased. Conversely, as the angle θ is increased the lift from blade 40 is increased, as long as the blade 40 does not stall, while the drag on blade 40 is also increased. The problem that arises is that angles that give sufficient lift at low wind speeds, cause so much drag at high wind speeds that the turbine 10 might be torn apart. Mechanisms that vary the angle θ in response to wind speed can solve this problem but at a cost in terms of complexity.

In a highly preferred embodiment, blades 40 are fixed at a relatively low θ such that the turbine will not be damaged at high wind speeds, while the shroud and conical fairing enhance the torque obtained at low wind speeds by increasing the air speed past the blades 40°. In order to enhance low wind speed performance even further, applicant believes that one way of generating increased torque at low wind speeds, given a relatively low θ will be to provide large vortex generating mechanisms (see FIG. 8) on the top leading airfoil surface 76 of a modified blade 40a which would be used in place of the blades 40. By mimicking the vortices insects elicit that flow across the top surface of their wings, the phenomenal lift that they achieve can also be duplicated.

Figure 8:
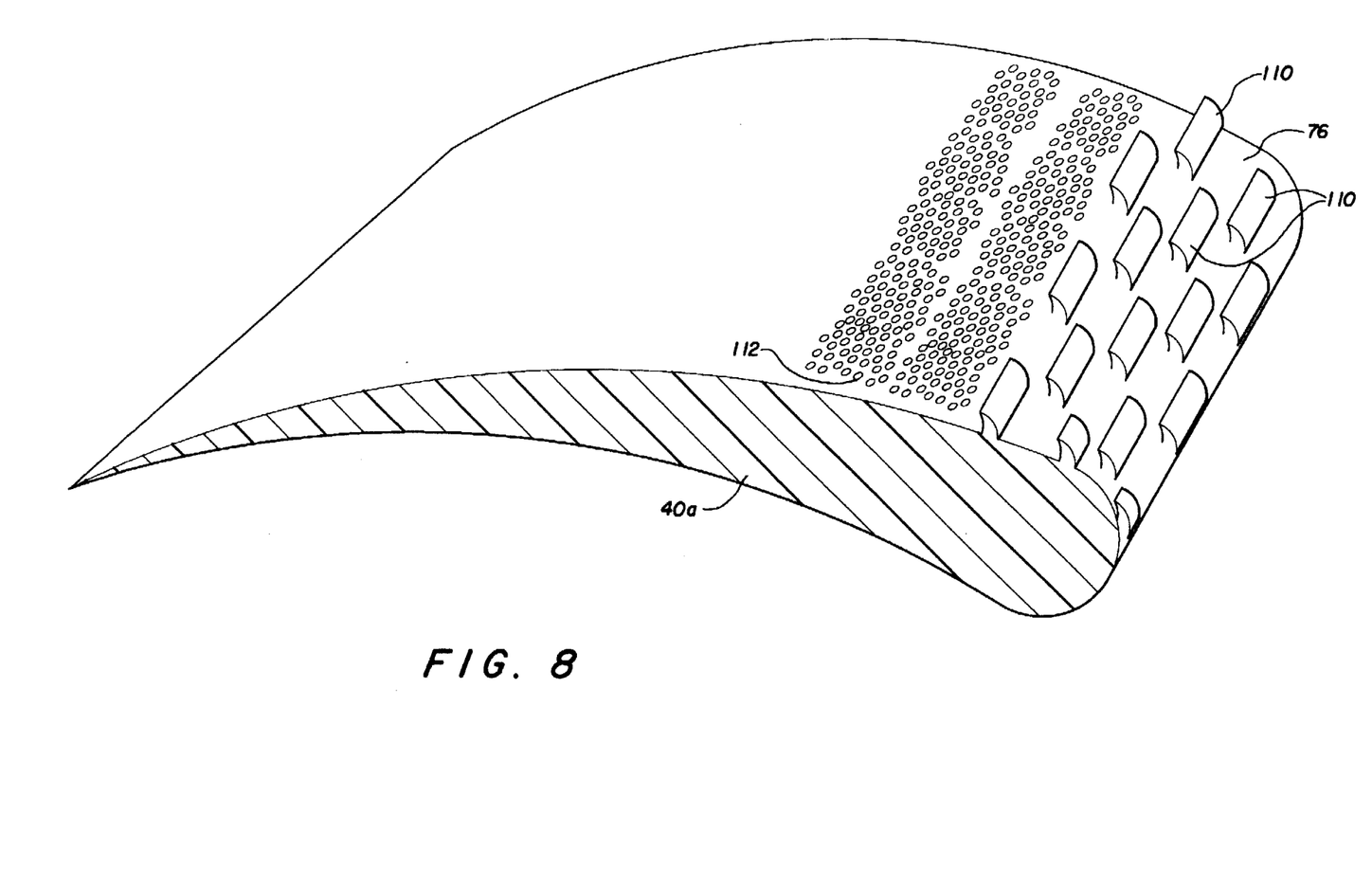
FIG. 8 is a detailed view of a turbine blade having turbulence generating mechanisms on the upper surface of its leading edge.

Although applicant does not wish to be bound by any particular theory, another possible explanation for the enhanced effect of large vortex generating mechanisms is that at low wind speed the generated vortex causes the airfoil to mimic an airfoil of greater thickness which normally would provide increased lift at low air speeds. At higher wind speeds, the wind causes the vortex to be "squashed" thus allowing blade 40 to have the reduced drag associated with thinner airfoils at high wind speeds (also see FIGS. 9a and 9b). Therefore, the vortex generating mechanisms will allow a fixed angle blade to provide good lift in low wind speeds while having less drag at high wind speeds. FIG. 8 shows examples of vortex generating mechanisms. Blade 40a in FIG. 8 shows interlaced or overlapping scales 110 provided on the top leading surface of the turbine blade.

Blade 40a also shows dimples 112 similar to those on a golf ball, which may or may not be used in combination with scales 110, provided on the entire surface of the turbine blade. Though the vortices generated are not large enough to provide much lift, they do provide enough turbulence to significantly reduce drag across a surface due to the disruption of the prandtl boundary.

Another embodiment for the turbine blades 40 would be an airfoil 40b with a very high camber as shown in FIG. 9a also made from polyethylene, which under pressure from increasing wind speeds alters its shape by flexing primarily its tail section 114 resulting in an airfoil of less camber thereby reducing drag and improving survival in extreme winds.

In another preferred embodiment for a turbine blade with an airfoil profile, all previously mentioned embodiments would be employed. Thus, first it would be made of polyethylene with a hollow high lift profile capable of being altered into a more aerodynamic, i.e. having less drag, profile by high winds. Second, it would have large vortex generating mechanisms upon its leading airfoil surface for eliciting vortices which would mimic thicker airfoils in low wind speeds. Third, it would have small dimples very similar to golf balls over the rest of its surfaces to reduce drag across those surfaces. Forth, it would be manufactured using vacuum molding techniques to produce all the above features at the same time, and therefore would be extremely cheap to produce. And at last, to would be mounted at a relatively low pitch angle so as to improve survival in extreme winds, but not low enough to significantly compromise lift production.

Another embodiment of the present invention is one where the airfoil blades are replaced with spinning cylinders. Referring to FIGS. 10, 11, 12a and 12b, when cylindrical blades 78, 80a, and 80b spin about their longitudinal axes, the side moving into the wind is at high pressure while the side moving away from the wind is at low pressure. Thus, a net torque is applied to the turbine 10 causing it to rotate. The S-turbines 82 and ribbed cylinder 80b allow the wind to spin cylinders 78, 80a, and 80b while simultaneously spinning turbine 10, thus no auxiliary energy source for spinning the cylinders 78, 80a, and 80b is needed.

Referring to FIGS. 1–5, the guy wires 101 are well known items and therefore are not shown in detail here. Rain shields 91 aid in keeping rain water away from bearings 98. Optional tuning weights 102 are provided to keep sections 86 from bowing and vibrating due to harmonic oscillations.

Figure 3:
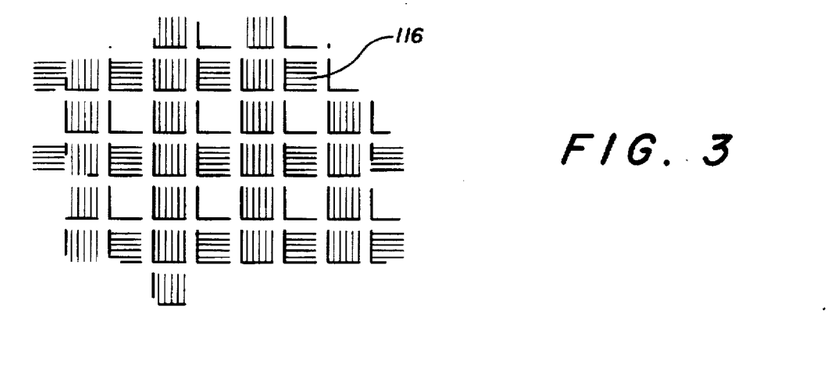
FIG. 3 is a fragmentary view of a fabric with holes for use as the material for the shroud of the wind turbine.

Referring to FIGS. 1–3, the shroud 46 can be in one piece or it may be made up of overlapping fabric panels 104 which have open seams. This feature allows some energy shedding in high winds thus providing some protection from damage to the turbine 10. As an alternative, the shroud 46 can be made from a fabric 116 with a checker-board type weave (See FIG. 3), which has an alternating pattern of fabric and holes. If the fabric was made of larger denier material, thus stronger, the air spaces would result in less weight and material costs without sacrificing strength. Due to the location of shroud 46 at the outermost radius of turbine 10 when rotation begins shroud 46 has a lot of rotational speed. This speed elicits enough turbulence along the surface of shroud 46, combined with the shroud's rotational speed to effectively prevent air escape and divert the wind stream into blades 40. Similar effects have long been recognized as a design fault with old drag type multibladed windmills for pumping water, wherein high winds combined with the high rotational speed of the blades created a solid disc effect preventing efficient high speed operation.

Additionally, it is preferred that all embodiments of shroud 46 and central deflecting cone 36 be made from dark colored materials that have been ultraviolet light stabilized or protected. Solar radiation gain should prove very useful in preventing ice formation during winter operations as well as a slight gain in efficiency for turbine 10 due to heat transfer to the captured wind stream.

The preferred materials for the fabric are ripstop parachute nylons, CORDURA™, KEVLAR™, M™, DACRON™, or combinations thereof. The guy wires and support cables can be steel or they can be also be a synthetic material such as KEVLAR™, DACRON™, braided polyethylene, or combinations thereof. Turn buckles (not shown) can be provided in the support cables and guy wires to adjust the length and the tension of the wires. Optionally, for very large turbines the interior of conical fairing 36 back to support cables 32 can be filled with a helium filled bag. Thus, the weight supported by gear box 14 and tower 12 can be reduced to manageable levels for very large turbines. Additionally, apical support structure 18 can act as a reservoir for highly compressed helium with the appropriate pressure regulating apparatus to maintain the helium bag's desired pressure. Also, flange 28 can have connections for the initial filling of the helium bag.

It is to be understood that the present invention is not limited to the embodiments described above, but encompasses any and all embodiments within the scope of the following claims.

I claim:

1. A wind turbine comprising:

an apical support structure including a cylindrical shaft having a first end and a second end, a first flange provided at said first end of said cylindrical shaft, a hollow substantially frustoconical portion having a wide mouth and a narrow end attached to said second end of said cylindrical shaft, said substantially frustoconical portion defining a concavity;

a support rod having a first end and a second end, said first end of said support rod located within said concavity and attached to said narrow end of said substantially frustoconical portion, a second flange provided at said second end of said support rod;

a first support ring surrounding said support rod and axially located between said first end of said support rod and said second end of said support rod;

first set of support cables, each one of said first set of support cables extending between said second flange and said first support ring;

second set of support cables, each one of said second set of support cables extending between said substantially frustoconical portion and said first support ring, said first set of support cables and said second set of support cables being under tension to thereby maintain said first support ring in a fixed position relative to said support rod;

a fabric cover covering said second set of support cables to thereby form a central substantially conical fairing;

a second support ring concentric with and having a larger diameter than said first support ring;

a plurality of turbine blades extending between said first support ring and said second support ring;

a third support ring concentric with and having a larger diameter than said second support ring and being positioned closer to said substantially frustoconical portion relative to said second support ring when wind having a speed greater than or equal to a predetermined value is passing through said wind turbine;

a third set of support cables extending between said third support ring and said substantially frustoconical portion;

a fabric ring extending between said third support ring and said second support ring, said fabric ring essentially assuming the shape of a truncated parabola when wind having a speed greater than or equal to a predetermined value is passing through said wind turbine to thereby form a shroud for said plurality of turbine blades, said third set of support cables being under tension and in cooperation with said fabric ring maintaining said third support ring in a fixed position relative to said support rod when wind having a speed greater than or equal to a predetermined value is passing through said wind turbine; and a rotatably supported stub shaft fixedly attached to said first flange, whereby said shroud in cooperation with said conical fairing direct the wind toward said plurality of turbine blades thereby imparting rotational motion to said wind turbine to thereby derive usable power in mechanical form from the wind.

2. The wind turbine according to claim 1, wherein each of said first, second, and third support rings, said plurality of turbine blades, and said support rod has a hollow interior filled with compressed air to thereby increase rigidity.

3. The wind turbine according to claim 2, wherein each of said plurality of turbine blades has a first end and a second end, said first end of each of said plurality of turbine blades being fixed to said first support ring via a first branch saddle, said second end of each of said plurality of turbine blades being fixed to said second support ring via a second branch saddle, and each of said plurality of turbine blades being made of a polymeric material shaped by a process selected from the group consisting of heat fusion welding, injection molding, vacuum molding, extrusion, press forming, adhesive bonding, and combinations thereof, whereby each of said plurality of turbine blades having a predetermined shape, predetermined dimensions, a predetermined strength, and predetermined surface features can be fabricated simply and cheaply.

4. The wind turbine according to claim 3, wherein each of said plurality of turbine blades is a hollow airfoil capable of being altered by increasing wind speeds into a more aerodynamic profile with substantially less drag and thus improved survivability.

5. The wind turbine according to claim 3, wherein each of said plurality of turbine blades has a top surface and has vortex generating mechanism means provided on said top surface thereof.

6. The wind turbine according to claim 3, wherein each of said plurality of turbine blades is a cylinder having means for imparting rotation thereto when the wind is passing through said plurality of turbine blades.

7. A wind turbine comprising:

a central substantially conical fairing having an apex and a base;

a shroud substantially having the shape of a truncated parabola with a wide end and a narrow end, said narrow end being coplanar with the base of said conical fairing and said wide end being axially positioned between said apex of said conical fairing and said base of said conical fairing; and a plurality of turbine blades extending between said base of said conical fairing and said narrow end of said shroud, said wind turbine being rotatably supported at said apex of said conical fairing, whereby said shroud in cooperation with said conical fairing direct wind toward said plurality of turbine blades thereby imparting rotational motion to said wind turbine to thereby derive usable power in mechanical form from the wind.

8. The wind turbine according to claim 7, wherein each of said plurality of turbine blades has a hollow interior filled with compressed air to thereby increase rigidity thereof.

9. The wind turbine according to claim 8, wherein each of said plurality of turbine blades has a first end and a second end, said first end of each of said plurality of turbine blades being fixed to said first support ring via a first branch saddle, said second end of each of said plurality of turbine blades being fixed to a second support ring via a second branch saddle, and each of said plurality of turbine blades being made of a polymeric material which can be shaped by a process selected from the group consisting of heat fusion welding, injection molding, vacuum molding, extrusion, press forming, adhesive bonding, and combinations thereof, whereby each of said plurality of turbine blades having a predetermined shape, predetermined dimensions, a predetermined strength, and predetermined surface features can be fabricated simply and cheaply.

10. The wind turbine according to claim 9, wherein each of said plurality of turbine blades is a hollow airfoil capable of being altered by increasing wind speeds into a more aerodynamic profile with substantially less drag and thus improved survivability.

11. The wind turbine according to claim 9, wherein each of said plurality of turbine blades has a top surface and has vortex generating mechanism means provided on said top surface thereof.

12. The wind turbine according to claim 9, wherein each of said plurality of turbine blades is a cylinder having means for imparting rotation thereto when the wind is passing through said plurality of turbine blades.

13. The wind turbine according to claim 7, wherein each of said plurality of turbine blades has a first end and a second end, said first end of each of said plurality of turbine blades being fixed to a first support ring via a first branch saddle, said second end of each of said plurality of turbine blades being fixed to a second support ring via a second branch saddle, and each of said plurality of turbine blades being made of a polymeric material which can be shaped by a process selected from the group consisting of heat fusion welding, injection molding, vacuum molding, extrusion, press forming, adhesive bonding, and combinations thereof, whereby each of said plurality of turbine blades having a predetermined shape, predetermined dimensions, a predetermined strength, and predetermined surface features can be fabricated simply and cheaply.

14. The wind turbine according to claim 13, wherein each of said plurality of turbine blades is a hollow airfoil capable of being altered by increasing wind speeds into a more aerodynamic profile with substantially less drag and thus improved survivability.

15. The wind turbine according to claim 13, wherein each of said plurality of turbine blades has a top surface and has vortex generating mechanism means provided on said top surface thereof.

16. The wind turbine according to claim 13, wherein each of said plurality of turbine blades is a cylinder having means for imparting rotation thereto when the wind is passing through said plurality of turbine blades.

* * * * *